(12) United States Patent
Achilles et al.

(10) Patent No.: US 7,318,194 B2
(45) Date of Patent: Jan. 8, 2008

(54) METHODS AND APPARATUS FOR REPRESENTING MARKUP LANGUAGE DATA

(75) Inventors: Heather D. Achilles, Hudson, NH (US); Steven R. Willis, Acton, MA (US); Charles Robert Morgan, Manchester, MA (US); Kenneth R. Ballou, Framingham, MA (US); Jan-Christian Nelson, Boston, MA (US); Eugene Kuznetsov, Cambridge, MA (US)

(73) Assignee: International Business Machines Corporation (IBM), Armonk, NY (US)

( * ) Notice: Subject to any disclaimer, the term of this patent is extended or adjusted under 35 U.S.C. 154(b) by 553 days.

(21) Appl. No.: 11/013,951

(22) Filed: Dec. 16, 2004

(65) Prior Publication Data

US 2006/0235868 A1   Oct. 19, 2006

Related U.S. Application Data

(63) Continuation-in-part of application No. 10/883,018, filed on Jul. 1, 2004, and a continuation-in-part of application No. 10/883,484, filed on Jul. 1, 2004, and a continuation-in-part of application No. 10/883,483, filed on Jul. 1, 2004, and a continuation-in-part of application No. 10/883,016, filed on Jul. 1, 2004.

(60) Provisional application No. 60/561,030, filed on Apr. 9, 2004, provisional application No. 60/548,034, filed on Feb. 26, 2004, provisional application No. 60/539,357, filed on Jan. 27, 2004, provisional application No. 60/536,039, filed on Jan. 13, 2004.

(51) Int. Cl.
*G06F 15/00* (2006.01)

(52) U.S. Cl. .................. 715/513; 707/100; 707/101

(58) Field of Classification Search .................. 707/1, 707/100, 101, 102; 715/500, 500.1, 513, 715/514, 517; 709/203, 246
See application file for complete search history.

(56) References Cited

U.S. PATENT DOCUMENTS 6,466,940 B1 * 10/2002 Mills .......................... 707/102

(Continued)

OTHER PUBLICATIONS

Nils Klarlund et al., DSD A schema language for XML, Aug. 2000, Proceeding of the third workshop on Formal methods in software practice FMSP, ACM Press, pp. 101-111.*

(Continued)

*Primary Examiner*—Jeffrey Gaffin
*Assistant Examiner*—Jacques Veillard
(74) *Attorney, Agent, or Firm*—Chapin IP Law, LLC; Barry W. Chapin, Esq.

(57) ABSTRACT

A representation of a markup language data such as XML expressed as a sequence of encoded items provides a data format including a type field containing i) a construct type identifying a type of markup language data construct to which the encoded item corresponds or, ii) a directive type identifying directive information concerning a processing characteristic associated with the sequence of encoded items. If the type field contains a construct type, the encoded item includes i) a length field containing a size of construct data associated with the markup language data construct to which the encoded item corresponds and ii) a value field identifying construct data associated with the markup language data construct to which the encoded item corresponds. For a directive type, the encoded item includes a directive value supplementing the directive information concerning a processing characteristic associated with the sequence of encoded items.

36 Claims, 4 Drawing Sheets

U.S. PATENT DOCUMENTS

| | | | |
|---|---|---|---|
| 6,671,853 B1 * | 12/2003 | Burkett et al. | 715/513 |
| 6,772,180 B1 * | 8/2004 | Li et al. | 715/513 |
| 6,772,413 B2 * | 8/2004 | Kuznetsov | 717/136 |
| 6,804,677 B2 * | 10/2004 | Shadmon et al. | 707/101 |
| 6,850,948 B1 * | 2/2005 | Krasinski | 707/101 |
| 7,013,424 B2 * | 3/2006 | James et al. | 715/513 |
| 7,024,413 B2 * | 4/2006 | Binding et al. | 707/101 |
| 7,213,201 B2 * | 5/2007 | Brown et al. | 715/513 |
| 2003/0177443 A1 * | 9/2003 | Schnelle et al. | 715/513 |
| 2006/0236224 A1 * | 10/2006 | Kuznetsov et al. | 715/513 |
| 2006/0236225 A1 * | 10/2006 | Achilles et al. | 715/513 |

OTHER PUBLICATIONS

R. J. Bayardo et al., An evaluation of binary xml encoding optimazations for fast stream based xml processing, May 2004, International World Wide Web conference, Proceedings of the 13th international conference on World Wide web, ACM Press, pp. 345-354.*

* cited by examiner

FIG. 4

METHODS AND APPARATUS FOR REPRESENTING MARKUP LANGUAGE DATA

CLAIM TO BENEFIT OF EARLIER FILED APPLICATIONS

This Utility patent application is a Continuation-in-Part application under 35 USC 120 of the following four Utility patent applications:

1) Utility patent application entitled "METHOD AND APPARATUS FOR PROCESSING MARKUP LANGUAGE INFORMATION," filed Jul. 1, 2004 having Ser. No. 10/883,018.
2) Utility patent application entitled "METHODS AND APPARATUS FOR CONVERTING MARKUP LANGUAGE DATA TO AN INTERMEDIATE REPRESENTATION," filed Jul. 1, 2004 having Ser. No. 10/883,484.
3) Utility patent application entitled "METHODS AND APPARATUS FOR CONVERTING A REPRESENTATION OF XML AND OTHER MARKUP LANGUAGE DATA TO A DATA STRUCTURE FORMAT," filed Jul. 1, 2004 having Ser. No. 10/883,483.
4) Utility patent application entitled "METHOD AND APPARATUS FOR STREAM BASED MARKUP LANGUAGE POST-PROCESSING," filed Jul. 1, 2004 having Ser. No. 10/883,016.

This application also claims the benefit of the filing date of the following co-pending U.S. Provisional Applications under 35 USC 119:

5) Provisional Patent Application entitled "METHOD AND APPARATUS FOR PROCESSING MARKUP LANGUAGE INFORMATION" filed Jan. 13, 2004, having Ser. No. 60/536,039.
6) Provisional Patent Application entitled "METHOD AND APPARATUS FOR MARKUP LANGUAGE PROCESSING AND TREE BUILDING" filed Jan. 27, 2004, having Ser. No. 60/539,357.
7) Provisional Patent Application entitled "METHODS AND APPARATUS FOR STREAM PROCESSING OF MARKUP LANGUAGE DATA" filed Feb. 26, 2004, having Ser. No. 60/548,034.
8) Provisional Patent Application entitled "METHOD AND APPARATUS FOR XML STREAM BASED XPATH EXPRESSION EVALUATION" filed Apr. 9, 2004 having Ser. No. 60/561,030. Each of the above referenced applications is assigned to the same Assignee as the present application. The entire teachings, figures and contents of the above-identified applications are hereby incorporated by reference herein.

RELATION TO CO-PENDING APPLICATIONS

This Utility patent application relates to technology disclosed in the following co-pending Utility patent application:

U.S. Utility patent application entitled "METHODS AND APPARATUS FOR PROCESSING MARKUP LANGUAGE MESSAGES IN A NETWORK", Filed Dec. 22, 2003, having Ser. No. 10/745,326.

The entire teachings and contents of the above-referenced Utility and Provisional Patent Applications are hereby incorporated herein by reference in their entirety.

BACKGROUND

Computer systems represent and exchange data that is encoded in a variety of data encoding formats. One type of conventional data encoding format that computer systems use to represent many different types of information is known as the eXtensible Markup Language, or simply XML. XML is a widely adopted data encoding format and specification developed by the World Wide Wed Consortium (W3C). XML is a pared-down version of Standard Generalized Mark-Up Language (SGML), designed especially for creation and representation of Web documents. XML files, typically referred to as documents, provide a text-based encoding format that enables a human to view the file and obtain an understanding of its contents. XML is also similar to the HyperText Markup Language (HTML) that is used for the representation of Web pages since both use markup codes known as tags to identify specific data and attributes of that data. An XML document consists mainly of text and tags, and the tags imply a hierarchical tree structure upon the data contained in the XML document.

A conventional XML data processing environment includes many tools that enable sophisticated processing, transformation and interpretation of XML documents. As an example, XML allows designers to create their own customized tags, enabling the definition, transmission, validation, and interpretation of data between applications and between organizations. Computer programs can automatically extract data from an XML document using an associated Document Type Definition (DTD) as a guide to the various XML tags used to encode the data. A DTD is generally a collection of XML declarations that define the legal structure, elements, and attributes that are available for use in an XML document. An XML document that properly complies to the DTD is said to be well-formed, indicating that the structure of the document is properly formatted using the tags of the DTD. For further information on standardized XML data formats, reference is made the XML standard definition entitled: Extensible Markup Language (XML 1.0 (Third Edition) maintained by the W3C, the entire contents of which is hereby incorporated by reference in its entirety.

Over the past several years, XML has become a preferred syntax for transferring information across computer networks such as the Internet. However, since XML documents are text-based documents they generally consume large amounts of space (e.g., memory, storage space or network bandwidth) when being processed y computer systems, as compared to the data formats such as binary data formats. In addition, since XML is text based, the process of decoding XML-encoded data can be slow and can consume large amounts of processing resources.

Motivated by performance drawbacks associated with XML, data processing system have utilized alternative data encoding systems to represent XML documents. As an example, a data encoding format known as Abstract Syntax Notation One with Basic Encoding Rules (ASN.1/BER) has been used in conventional data processing systems to represent XML data. ASN.1/BER is a protocol specification language developed in the 1980s that provides encoding rules that can provide a condensed representation of text-based data formats such as markup languages. Overall, ASN.1/BER tends to emphasize efficiency, while XML is targeted more at facilitating application development.

While ASN.1 supports the use of encoding mechanisms other than BER, the BER format provides a tag/type, length, value (TLV) representation of XML documents in an efficient manner. A TLV is a three part data structure that includes a tag or type field (the "T" in "TLV") indicating a type of XML construct represented by the TLV. A length field (the "L" in "TLV") is also included that indicates a length of data contained within the TLV structure. A value field (the "V" in "TLV") contains the value of the data represented the TLV structure. Conventional processes have been developed to convert XML constructs into streams of ASN.1/BER TLVs. The most common standards written in ASN.1 are those produced by the International Telegraph and Telephone Consultative Committee (CCITT) and the International Telecommunications Union (ITU). The reader is directed to these organizations for further details on the ASN.1/BER standard.

SUMMARY

Conventional data processing techniques and mechanisms that provide data formats such as ASN.1/BER for representation of a markup language is such as XML suffer from a variety of deficiencies. In particular, conventional use of ASN.1/BER TLV representation is limited to basic representation of only certain XML constructs.

Mechanisms, processing techniques and data formats described as embodiments herein provide for data formats expressed as a sequence of encoded items that provide for new type, length and value field representations of markup language data such as XML constructs. In particular, the data formats and processing techniques described herein provide for enhanced TLVs and processing features as compared with conventional markup language representations such as the ASN.1/BER TLV data format. Several advantageous encoded items are included that are not present within the conventional ASN.1/BER TLV data format. Some encoded items disclosed herein only use a type and length portion or a type and value portion, and do not require all three type, length, and value portions of the traditional TLV structure.

In addition, embodiments further provide for processing techniques that use the novel encoded item data formats disclosed herein, thus providing enhanced processing features not presently available using conventional data formats. As a result, the mechanisms, techniques and data formats disclosed herein advantageously increase processing capabilities and performance of data processing systems that support markup language processing, storage and transfer.

The data format of embodiments of the invention can be expressed as a computer readable medium configured with a data format representing markup language data. The data format is expressed as a sequence of encoded items. An encoded item of the data format comprises a type field containing either a construct type or a directive type. A construct type identifies a type of markup language data construct to which the encoded item corresponds. As an example, in the data format disclosed herein, there are construct types for XML constructs such as namespaces, start and end elements, and so forth. Alternatively, the type field can contain a directive type identifying directive information concerning a processing characteristic associated with the sequence of encoded items. As an example, during processing of large portions of XML data, there may be several buffers used to store a continuous portion of data. A new encoded item called a demarcation encoded item is disclosed herein to indicate the identity of a specific data buffer (e.g., in memory) for a specific encoded item that contains a value field that is to reference that specific data buffer.

According to the data format disclosed herein, if the type field contains a construct type, the encoded item further comprises i) a length field containing a size of construct data associated with the markup language data construct to which the encoded item corresponds, and ii) a value field identifying construct data associated with the markup language data construct to which the encoded item corresponds. Thus many encoded items disclosed herein contain a TLV format. Alternatively, if the type field contains a directive type, the encoded item further comprises a directive value supplementing the directive information concerning a processing characteristic associated with the sequence of encoded items. The demarcation encoded item briefly explained above is an example of a an encoded item containing a demarcation type field followed by a directive value identifying a data buffer to associated to another encoded item that is to reference the data in the data buffer.

Other embodiments that will be explained in detail shortly include specific unique encoded items and processing techniques that utilize these encoded items. Examples include encoded items that address XML stream fragmentation issues in which, for example, an XML data stream being converted to the encoded item data format is broken midstream due, for example, to a an event in which other data packets for different documents are interleaved as they arrive at a device performing the conversion process of XML to encoded item format. Other examples include: a namespace encoded item format for identifying XML namespaces; an unnecessary white space encoded item format for identifying unnecessary white space such as tabs, spaces and so forth in an XML data stream; and other encoded item variations. Still other embodiments relate to processing capabilities provided by such encoded items. The demarcation encoded item and associated processing ability as described herein are one example.

Other embodiments of the invention include a markup language processing device such as any type of computerized device, computer system, peripheral device (e.g., a circuit card or co-processor that can be installed into a computerized device for processing XML data, such as an XML co-processor), a network or data communications device, switch, router, dedicated XML processing device or the like configured with software and/or circuitry that implements a markup language processor that produces or processes the data format as summarized above and as explained in further detail below. Such a device can process any or all of the method operations disclosed herein as embodiments. Still other embodiments include software or firmware programs that can operate alone or in conjunction with each other in a computerized device to perform the method embodiment steps and operations summarized above and disclosed in detail below. Preferred operational embodiments are implemented in hardware for speed of processing however, though software implementations are considered to be embodiments as well.

One such software embodiment comprises a computer program product that has a computer-readable medium including computer program logic encoded thereon that, when performed in a computerized device having a coupling of a memory and a processor, programs the processor to perform the data format processing operations disclosed herein as embodiments of the invention to carry out TLV data format creation and processing on markup language data, such as XML or upon other markup languages. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments of the invention. Thus, encoded items alone, or software code written to processes such a data format upon any computer readable medium that contains instructions to carry out novel combinations of processing steps as explained herein, or any equivalents thereto, are considered embodiments.

It is to be understood that the system of the invention can be embodied strictly as a data format on a computer readable medium, a software program to produce or processes such a data format, as software and hardware, or as hardware alone (e.g., such as an XML co-processor on a chip, or in a circuit card, or as part of a network device). Example embodiments of the invention may be implemented within computer systems, network devices, processors, circuits, ASICs, FPGAs, and/or computer program products and/or software applications manufactured by Datapower Technology, Inc. of Cambridge, Mass., USA. The aforementioned co-pending U.S. patent applications disclose markup language processing devices within which embodiments may operate.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention disclosed herein provide for unique processing techniques and data formats containing encoded items capable of uniquely representing markup language constructs and data such as XML documents, as well as processing techniques and mechanism that take advantage of the unique encoded item format. In a preferred embodiment, a hardware device or software process such as a character processor converts a character stream of markup language data, such as XML data formatted according to an extensible markup language (XML) specification, into an intermediate representation containing encoded items according to the data format provided by embodiments of this invention.

The encoded items are representative of the original stream of markup language data and include unique encoded item representations not present in conventional TLV-based encodings such as ASN.1/BER. As an example, embodiments disclosed herein provide for an encoded item data format that supports fragmented XML document or stream processing. Fragmentation can occur, for example, when an XML data stream arriving at a processing device over a network is undergoing the process of conversion into the encoded item data format. If this XML document stream is interrupted for some reason, the document is fragmented. In such a case, the encoded item data format disclosed herein includes the capability for creation of a special fragmentation encoded item that identifies a fragmented markup language construct. The fragmentation encoded item placed at the end of the encoded item segment associated with the XML stream that was interrupted indicates that the XML construct data identified in the value field of the fragmentation encoded item is not a complete representation of all of the construct data associated with the markup language construct in the XML data to which that encoded item corresponds. In other words, when an XML stream is interrupted (e.g., a break in the series of packets arriving in a network device) during creation of the encoded data format, and data for an XML construct being received is interrupted, the encoded item data format provides for a fragmentation markup language construct indicating that the data identified as the value portion of that fragmentation encoded item is not an entire portion of data. This allows the XML data stream to resume arriving at some later time at which point the remaining portion of data for the fragmented construct is received. The fragmented encoded item allows the fragmented data portion, now partially present in two encoded item sequence, to be recognized as being a continuous portion of data. Another advantage to the fragment representation is that it allows the character processor to pass the "value" or construct data portion of the TLV to a post processing entity instead of requiring the character processor to store those characters while waiting for more data packets for this document to arrive. For hardware embodiments, this translates into requiring significantly less memory to store transient data.

As another example, conventional ASN.1/BER encoding of XML documents does not provide for type length value representations of a namespace construct defined within an XML document. Conversely, the data formats and processing mechanisms disclosed herein provide for an encoded item data format that includes namespace encoded items that identify namespaces associated with portions of markup language data represented by the data format. Since an XML namespace can define a set of valid XML tags used within the XML document, knowing an XML namespace during encoded item processing allows for operation of namespace mapping of elements while continuing to produce, interpret or otherwise process TLV encoded items for the markup language stream.

Other embodiments provided by the encoded item data format disclosed herein include creation and processing operations associated with demarcation encoded items that each respectfully identify or associate a respective demarcation sequence value with a respective construct data buffer maintained within memory in the computerized device. In particular, during processing and conversion of markup language data into a stream of encoded items (e.g., into the data format described herein), TLVs can have a value portion that contains a reference such as a pointer to a value buffer in memory that actually stores or maintains the data associated with the XML construct to which that TLV is associated. In other words, the encoded item data format disclosed herein supports values that are pointers or references to data contained in buffers within memory. The actual data in such encoded item is thus not stored within the TLV structure itself. This allows for fixed length TLV representations, since the value can be a fix bit or byte size since it only needs to contain an address of the value buffer associated with that TLV. In situations in which the stream of TLVs identifies several buffers that are returned to a post-processing device or process, such as a software program, creation and insertion of a demarcation TLV encoded item for each TLV referencing a distinct value buffer facilitates the identification of which value buffers are to be associated with which particular TLVs containing values referencing those buffers. This can allow for processing of buffers prior to full completion of TLV sequences. One purpose for demarcation encoded items is that the value portion of a construct encoded item containing the reference to the value buffer might not be know at the time of creation of the data value buffer and return of this buffer to a software process.

As an example, a demarcation TLV encoded item as disclosed herein can contain a demarcation sequence value such as integer associated with a respective construct data value buffer in memory to which a construct TLV containing a pointer is associated. Thus, the encoded item data stream (e.g., a sequence of TLVs) includes not only the TLV containing the value reference to the value buffer containing the data, but also contains a demarcation TLV that contains only a demarcation type and a value containing an indication of which value buffer of many contains the value associated with the construct TLV. The demarcation encoded item allows a process that is processing a sequence of encoded items (e.g., a receiving software process) to efficiently identify which construct data value buffers containing markup language construct data in memory are to be associated with which encoded items that contain value fields that reference those construct data offers. In this manner, TLVs can be maintained in a fixed size format and all the data is maintained in value buffers. The demarcation encoded items can be used to identify which data buffers are associated with which TLVs thus enhancing processing performance. In this configuration, the "value" portion of the TLV is stored in a construct data buffer in memory that is different from the buffer in which the TLV resides. As such, it can be difficult to ensure the order in which the construct data buffers are returned to the "entity" processing the TLVs, such as a software program receiveing the TLVs from a character processor. The Demarcation TLV thus provides a way to annotate the TLV stream to indicate that the "value pointers" in the next group of TLVs point to data in a new buffer. By counting the number of demarcation TLVs and the number of "text" (or whatever) construct data buffers returned, the processing entity can know if it has the construct data buffer associated with the TLV it is processing.

Another example advantage provided by the encoded item data format disclosed herein relates to determination of element consistency with the markup language data. In particular, the data format disclosed herein can include end element checked and end element unchecked encoded items. An end element checked encoded item identifies that element consistency within the markup language data represented by the encoded items up to the point of existence of the end element checked encoded item has been confirmed, whereas an end element unchecked encoded item identifies that the element consistency such as confirmation of matching start and end element tags within the markup language data represented by the encoded items up to the point of existence of the end element unchecked encoded item has not been confirmed. In this manner, a process performing operations on TLV encoded item data formats as disclosed herein can determine whether or not a TLV format has been checked for start and end element consistency.

Still other embodiments disclosed herein include encoded items to represent unnecessary white space occurring within markup language data represented by the sequence of imported items, as well as processing techniques for using the aforementioned encoded item data formats to improve overall markup language processing performance within a computerized device configured in accordance with the embodiments disclosed herein.

Figure 1:
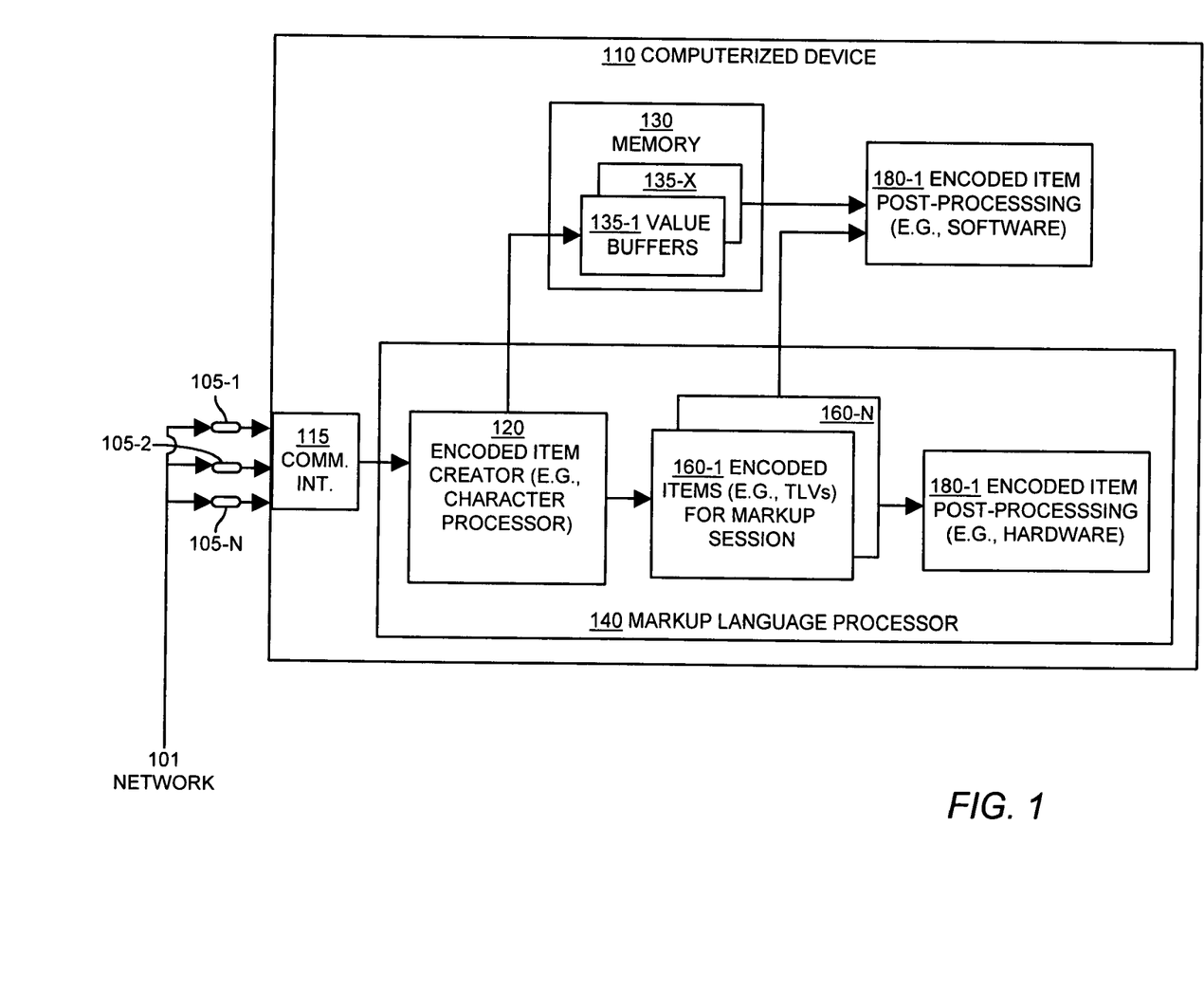
FIG. 1 illustrates an example of a computerized device including a character processor configured to produce a data format in accordance with embodiments of the invention.

FIG. 1 illustrates a computerized device 110 configured with a markup language processor 140 that operates in accordance with example embodiments. The computerized device 110 includes a communications interface 115 that may be coupled to a communications network 101 such as the Internet, or a local or wide area network. Generally, in operation the computerized device 110 in this example receives a plurality of (one or more) character streams of markup language data 105-1 through 105-N, such as XML data streams, from the network 101, each of which is associated with a respective markup language processing session (e.g., a data communications session or connection). As an example, the character streams of markup language data 105-1 through 105-N may be received by the communications interface 115 within the computerized device 110 as sequences of XML data packets over respective communications sessions such as Transmission Control Protocol (TCP)/Internet Protocol (IP) sessions from remote computer systems (not specifically shown). Alternatively, any type of communications protocol or method can provide one or more streams of markup language data to the computerized device 110 for receipt by a markup language processor 140 containing a character processor 120.

The character processor 120 converts streams of markup language data 105 received on a communications interface 115 into sequences of encoded items 160-1 through 160-N, each sequence 160 corresponding to a respective stream of markup language data 105-1 through 105-N. This processing is explained in detail in the aforementioned co-pending patent entitled "METHODS AND APPARATUS FOR CONVERTING MARKUP LANGUAGE DATA TO AN INTERMEDIATE REPRESENTATION" which describes detailed operation of state machines within the character processor 120 to produce the encoded items data format as described herein. The character processor 120 may be embedded within an XML processing system and the streams of XML data 105 can be received from applications or hardware within the computerized device 110 and no network is required for such an implementation. For purposes of this example however, a network 101 provides the streams of markup language data 105 to the communications interface 115.

The communications interface 115 may be any type of network port or software interface or other type of data Interface capable of receiving the streams of markup language data 105. The communications interface 115 forwards at least one character stream of markup language data 105 to the character processor 120 for conversion of the markup language data into the data format disclosed herein. The communications interface 115 in this example is capable of indicating (e.g., via access to information in a data communications protocol stack) to the character processor 120 which particular markup language data communications session (i.e., which particular character stream 105-1 through 105-N) is currently being provided to the character processor 120 at any point in time. This allows the character processor 120 to identify session or connection switch events or changes in which packets for one session 105 stop being received momentarily while packets for another session arrive for processing. This can result in fragmentation of XML data and the encoded item data format disclosed herein includes a fragmentation encoded item to deal with this situation. The character processor 120 produces a respective set of the encoded items 160-1 through 160-N for each XML communications session 105 respectively.

The computerized device 110 further includes a memory 130 that maintains value buffers 135-1 through 135-X. The value buffers 135 are used to store data portions of XML constructs contained within the XML data streams 105. In one embodiment of the data format, encoded items are fixed in size and the value field of such encoded items contains a pointer or other reference to the actual data associated with an XML construct that is maintained within one of the value buffers 135.

The encoded items 160 and their associated value buffers 135 can be post-processed by encoded item post-processing mechanisms 180 that may be hardware 180-1 and/or software 180-2. Such post-processing mechanisms 180 can utilize the benefits of the data format as explained herein for increased post-processing performance that is not available using XML encoding formats such as conventional ASN.1/BER encoding of XML data. The subsequent post-processing mechanisms 180 can include, for example, an output generator capable of creating a linked tree data structure that can be utilized by a software application or other processing to access segments of XML within the entire input stream 105. Further still, the character processor can output the encoded item data for input into a filtering device, such as a hardware based programmable filter (e.g., XPATH filtering device). Details of example post-processing operations that may be performed on the intermediate representation 160 are described in the aforementioned co-pending patent applications.

Figure 2:
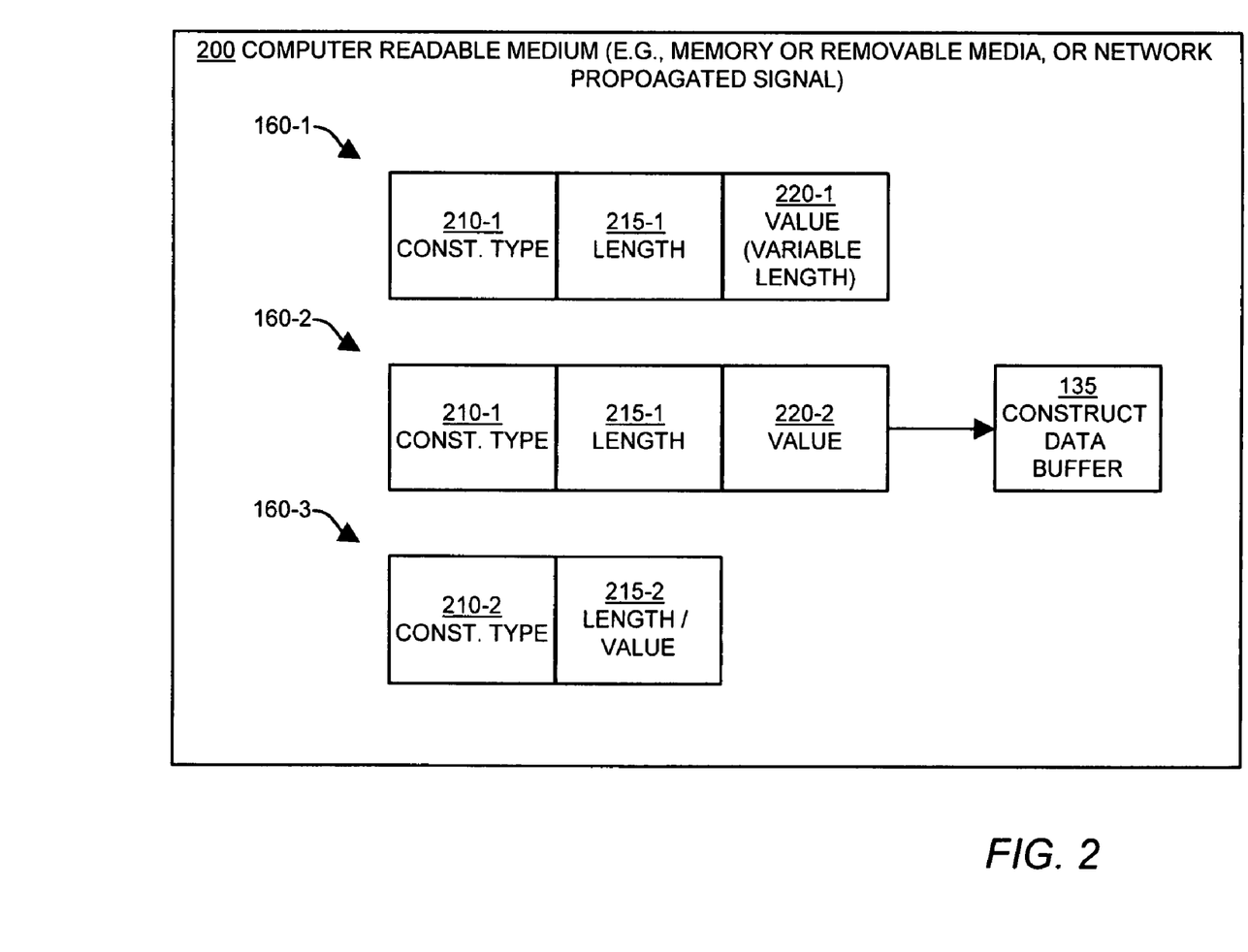
FIG. 2 illustrates diagrams of encoded items in accordance with embodiments of the invention.

FIG. 2 is a diagram that shows a computer readable medium 200 such as a memory, or removable media such as a disk, CD-ROM, tape or the like encoded with the general structure of a data format configured in accordance with embodiments of the invention. The computer readable medium 200 is configured with a data format representing markup language data and the data format is expressed as a sequence of encoded items having structures as shown by example encoded item formats 160-1, 160-2 and 160-3. Note that there are no actual data values in each field. Encoded items of this invention conform to the encoded item data structures 160-1 through 160-3 and represent either construct encoded items (formats 160-1 and 160-2) containing type, length and value fields, or directive encoded items 160-3 containing type and value fields 210-2 and 215-2.

Construct encoded items 160-1 and 160-2 include a construct type 210-1 that identifies a type of markup language data construct to which the encoded item 160 corresponds. In other words, a construct encoded item 160-1 or 160-2 represents an XML construct within an XML document to which the encoded item corresponds. Generally, if the type field 210-1 of an encoded item 160 contains a construct type 210-1, the encoded item 160 further comprises a length field 215-1 and value fields 220-1 or 220-2. The length field 215-1 contains a size of construct data contained in or referenced by the value fields 220-1 or 220-2. The value fields 220-1 or 220-2 of a construct encoded item contain or reference construct data associated with the markup language data construct to which the encoded item corresponds. Note that the value field 210-1 actually stores the data of the XML construct within the encoded item data structure, whereas the value field 210-2 is an attribute field that contains a pointer or other reference to the actual construct data that is maintained externally from the TLV encoded item data structure 160-2, such as within a value buffer 135 stored elsewhere in the computer readable medium (e.g., in memory).

Each directive encoded item 160-3 contains only a directive type field 210-2 and a directive length or value field 215-2. A directive type 210-2 identifies directive information concerning a processing characteristic associated with the sequence of encoded items 160 in which the directive encoded item resides. If the type field 210 contains a directive type 210-2, the encoded item 160 further comprises a directive value length or value 215-2 supplementing the directive type information and provides a processing characteristic associated with the sequence of encoded items.

As an example, a directive encoded item 160-3 might contain a demarcation type in the directive type field 210-2, followed by a demarcation buffer identity directive value 215-2 indicating a buffer number to be associated with a TLV value that follows the demarcation encoded item 160 in a sequence of encoded items. Alternatively, a directive encoded item 160-3 might be used to indicate a close start element or an empty element and have no associated data (thus no value field is needed). Thus, directive encoded items contain directives that provide useful processing information to a process that operates on the sequence of encoded items.

Generally then, the encoded item data format 160 provides a set of "Types" that generally correspond to the different types of XML constructs that are encountered within character streams of XML markup language data. In alternative configurations, the set of types can be configured to correspond to constructs of different markup languages other than XML, such as HTML, SGML or another markup language. However, for purposes of description of example embodiments, the set of construct types available for encoded items are used for conversion of XML and generally correspond to the following construct types:

1. Start tag prefix
2. Start tag local part
3. End tag prefix
4. End tag local part
5. Empty element
6. PI target
7. PI Data
8. Comment
9. Attribute name prefix
10. Attribute name local part
11. Attribute Value
12. XML version number
13. XML encoding value
14. XML declaration standalone value
15. Text
16. DTD Name
17. DTD Public ID
18. DTD System ID
19. DTD Subset
20. Entity
21. Close Start Element
22. Namespace prefix
23. Namespace URI
24. Unnecessary Whitespace
25. Demarcation Example List of Construct "Types" for XML Encoded Items Specific examples of conversion of specific XML markup language constructs into corresponding TLV encoded item data formats in accordance with embodiments will be provided shortly. As the character processor 120 encounters XML constructs within a character stream 105 of XML markup language data, it identifies the XML construct and produces appropriate encoded items 160 containing codes or strings associated with the aforementioned "Types" of XML constructs. For many XML constructs, the character processor 120 obtains a portion of the XML character stream as data corresponding to the identified construct to be stored in or referenced by the "Value" portion for the TLV encoded item 160. The character processor establishes or calculates the "Length" field "L" of the TLV to be equal to the number of alphanumeric characters or bytes within the "Value" portion copied, obtained or otherwise extracted from the character stream of markup language data. In other words, for each XML construct identified in the character stream 105 of markup language data, the character processor 120 produces a sequence of one or more TLV encoded items 160 containing types selected from the list above (except for directive encoded items such as demarcation encoded items), and those TLVs include a length field indicating how many alphanumeric characters are contained or referenced by in the value field.

The character processor places the appropriate characters representing the data associated with the identified construct within the value field 220-1 or within a value buffer 135. For some types of constructs encountered in the XML data stream, an encoded item is produced in which the value field is null and only the type and length fields are used, as in the case of a TLV that represents the close or "end" of a start element or an empty element. Those familiar with XML syntax and structuring constructs will readily identify the various XML constructs in the list of TLV Types given above.

A brief example of XML constructs that the character processor 120 converts to corresponding TLV sequences in the data format disclosed herein is provided below to illustrate converting XML constructs to the data format of this invention. The following example of XML inputs show samples of different types of actual XML constructs containing data and their corresponding TLV encoded item equivalents as produced by a character processor 120 configured to produce the data format in accordance with embodiments of the invention:

Document Type Definition Encoded Item Example:
XML input:
<!DOCTYPE dtdname SYSTEM xyz_literal [random data]>
Encoded item equivalent:

| TYPE | Length | Value |
|---|---|---|
| DTD Name | 7 | dtdname |
| DTD System URI | 11 | xyz_literal |
| DTD subset | 11 | random data |

XML Declaration Encoded Item Example:
XML input:
<?xml version='1.0' encoding='UTF-8' standalone='no'?>
Encoded item equivalent:

| TYPE | Length | Value |
|---|---|---|
| XML version | 3 | 1.0 |
| XML Encoding | 5 | UTF-8 |
| XML standalone | 2 | no |

Comment Encoded Item Example:
XML input:
<!--This is a comment-->
Encoded Item Equivalent:

| TYPE | Length | Value |
|---|---|---|
| Comment | 17 | This is a comment |

Processing Instruction Encoded Item Example:
XML input:
<?proc_inst data_for_instruction?>
Encoded item equivalent:

| TYPE | Length | Value |
|---|---|---|
| PI Target | 9 | proc_inst |
| PI Data | 20 | data_for_instruction |

In one configuration, the data format includes a namespace encoded item that identifies a namespaces associated with at least a portion of the markup language data represented by the data format. As shown below, the namespace encoded item contains a type field containing a namespace construct type indicating that the encoded item represents a namespace associated with the markup language data. The namespace encoded item also contains a value field identifying namespace construct data that indicates the namespace associated with the at least a portion of the markup language data represented by the data format.

Namespace Encoded Item Example:
XML input:
<root xmlns:rtz='http://www.xyz.com'/>
Encoded item equivalent:

| TYPE | Length | Value |
|---|---|---|
| Start Tag Local Part | 4 | root |
| Namespace prefix | 5 | rtz |
| Namespace URI | 18 | http://www.xyz.com |
| Empty Element | 0 | |

By providing a namespace encoded item as shown in lines 2 and 3 in the above example, as elements of XML data are converted to encoded items from an XML data stream, and in post processing as the encoded item data format is utilized, the namespace identification allows mapping of elements to that namespace. As an example, in one configuration, the sequence of encoded item further includes a close start element encoded item that contains a type field containing a close start element construct type indicating an end of a start element construct within the markup language data represented by the data format. An example of the creation and use of a close start element is as follows:

Element & Attribute Encoded Item Example:
XML input:
<rtz:elem_name qre:attr1='123_value'>
Encoded item equivalent:

| TYPE | Length | Value |
|---|---|---|
| Start Tag Prefix | 3 | rtz |
| Start Tag Local Part | 9 | elem_name |
| Attribute name prefix | 3 | qre |
| Attribute name suffix | 5 | attr1 |
| Attribute value | 9 | 123_value |
| Close Start element | 0 | |

The close start element encoded item above (the last encoded item in the example) allows a computing device 110 that processes the sequence of encoded items to identify a group of encoded items associated with the namespace (e.g., rtz) associated with the markup language data, as indicated by the namespace construct data (e.g., rtz namespace) presented in the aforementioned example. Since the namespace is known, this allows the computerized device to map elements within the group of encoded items to the namespace (e.g., using the start tag prefix containing the namespace identifier for that element, in conjunction with the mapping of this namespace to the URL http://www.xyz.com). In addition, if the namespace changes or others are declared, embodiments of the data format disclosed herein can accommodate different namespace specifications using the namespace encoded item format, but allowing mapping of elements to each namespace in real time, as the markup data is received.

The following XML document input followed by its corresponding conversion to an example data format configured in accordance with embodiments of the invention illustrates further aspects of embodiments of this invention:

Example XML Document:

```
<?xml version='1.0' encoding='UTF-8' standalone='no'?>
<!DOCTYPE dtdname SYSTEM xyz_literal [random data] >
<!--This is a comment-->
<?proc_inst data_for_instruction?>
<root xmlns:abc='http://www.xyz.com' >
<abc:elem_name abc:attr1='123_value; '/>
text data &en_ex;
</root>
```

Below is the corresponding encoded item data format for above XML Example Document (note column 1 is to indicate line numbers in the sequence of encoded items and is not part of the data format) produced in accordance with embodiments of the invention:

Encoded item examples (except column 1, used to indicate line numbers only):

| LINE NUMBER | TYPE 210 | LENGTH 215 | VALUE 220 |
|---|---|---|---|
| 1 | XML version | 3 | 1.0 |
| 2 | XML Encoding | 5 | UTF-8 |
| 3 | XML standalone | 2 | no |
| 4 | Unnecessary whitespace | 1 | Carriage return |
| 5 | DTD Name | 7 | dtdname |
| 6 | DTD System URI | 11 | xyz_literal |
| 7 | DTD stuff in [] | 11 | random data |
| 8 | Unnecessary whitespace | 1 | Carriage return |
| 9 | Comment | 17 | This is a comment |
| 10 | Unnecessary whitespace | 1 | Carriage return |
| 11 | PI Target | 9 | proc_inst |
| 12 | PI Data | 20 | data_for_instruction |
| 13 | Unnecessary whitespace | 1 | Carriage return |
| 14 | Start Element Suffix | 4 | root |
| 15 | Namespace prefix | 5 | abc |
| 16 | Namespace URI | 18 | http://www.xyz.com |
| 17 | Close Start Element | 0 | |
| 18 | Unnecessary whitespace | 1 | Carriage return |
| 19 | Start Element Prefix | 3 | abc |
| 20 | Start Element Local Part | 9 | elem_name |
| 21 | Attribute name prefix | 3 | abc |
| 22 | Attribute name Local Part | 5 | attr1 |
| 23 | Attribute value | 9 | 123_value |
| 24 | Empty element | 0 | |
| 25 | Content | 10 | text data |
| 26 | Entity | 5 | en_ex |
| 27 | Unnecessary whitespace | 1 | Carriage return |
| 28 | End Element checked | 0 | |

The above example encoded item sequence also illustrates the use of end element checked encoded items. In the above example, the data format at line 28 includes an end element checked encoded item that identifies that element consistency with the markup language data represented by the encoded items up to the point of existence of the end element check encoded has been confirmed. By elements consistency, what it meant is that all start and end elements are properly matching one another. Upon receipt of an end element checked encoded item, this allows namespace mapping to be performed for elements during the creation and/or processing of encoded items sequences.

For those elements for which checking has not been performed, the data format can include an end element unchecked encoded item that identifies that element consistency with the markup language data represented by the encoded items up to the point of existence of the end element check encoded has not been confirmed. This is not shown in the above example.

Another aspect of the invention shown in the above example is the use of unnecessary whitespace encoded items. In particular, the data format above at line 27 includes an unnecessary whitespace encoded item that identifies unnecessary whitespace occurring within the markup language data represented by the sequence of encoded items. By representing whitespace characters such as spaces, tabs, carriage returns, and the like, an exact replication of the XML data is maintained by the encoded item format. In addition, data format conversion can be performed of the whitespace data to different encoding formats, such as UTF-8 encoding.

FRAGMENTATION

As noted above, the data format disclosed herein includes the ability to handle situations in which XML data streams being converted to the encoded item data format are interrupted for any reasons. When such interruptions occur, a fragmentation encoded item is created and used to represent any partially received XML construct. In particular, the data format includes a fragmentation type length value encoded item that identifies a fragmented markup language construct indicating that construct data identified in the value field of the encoded item is not a complete representation of construct data associated with the markup language construct to which that encoded item corresponds. The fragmentation encoded items, the type field is a fragmented construct type that identifies the fragmented markup language construct that occurred during creation of the data format representing the markup language data due to an interruption in the markup language data. The fragmentation type length value encoded item thus identifies the fragmented markup language construct is a last encoded item containing markup language data generated in the sequence of encoded items up to the interruption in the markup language data. The following example illustrates this aspect of embodiments of the invention:

Consider the example of XML converted to encoded items without the occurrence or fragmentation:
Example XML Document stream 105:
<root>text_data</root>
Corresponding encoded item data format:

| TYPE | Length | Value |
|---|---|---|
| Start Element Local Part | 4 | root |
| Close start element | 0 | |
| Content | 9 | text_data |
| End Element Checked | 0 | |

Now consider the same segment of XML data (i.e., the stream <root>text_data</root>) where fragmentation, or the interruption of the stream 105 of XML data occurs twice. The first interruption occurs at the point of receiving the first three characters of XML data "<ro" and the fragmentation encoded item to represent this appears as follows:

Fragmentation Example #1

1$^{st}$ piece of document: <ro
Corresponding encoded item data format:

| TYPE | Length | Value |
|---|---|---|
| Start Element Local Part - fragment/continuation | 2 | Ro |

After some time elapses and the same XML document stream 105 resumes, the next segment of the stream "ot>tex" is then received upon which a second interruption causing fragmentation occurs as follows:
2$^{nd}$ piece of document ot>tex
Corresponding encoded item data format:

| TYPE | Length | Value |
|---|---|---|
| Start Element Local Part | 2 | ot |
| Close start element | 0 | |
| Content - fragment/continuation | 3 | tex |

Finally, the third and final portion of XML data is received as follows:
3$^{rd}$ piece of document: _data</root>
Corresponding encoded item data format:

| TYPE | Length | Value |
|---|---|---|
| Content | 5 | _data |
| End Element Checked | 0 | |

As shown in the above example, each type field 210-1 can include a fragmentation construct type indicating the type of XML construct that is partially represented by the encoded item, and since the type field includes a "Local Part" appended to the end, it is referred to herein as a fragmentation encoded item indicating that the encoded item does not completely represent the entire XML construct. Any construct types with "Local Part" included in their type field 210 are referred to herein as the fragmentation encoded items. The example below illustrates a second example of fragmentation encoded item sequences produced for the same XML input where the interruption occurs at different locations.

Example XML Document stream 105:
<root>text_data</root>

Fragmentation Example #2

1$^{st}$ piece of document: <root
Corresponding encoded item data format:

| TYPE | Length | Value |
|---|---|---|
| Start Element Local Part - fragment/continuation | 4 | ro |

2$^{nd}$ piece of document >text_data
Corresponding encoded item data format:

| TYPE | Length | Value |
|---|---|---|
| Start Element Local Part | 0 | |
| Close start element | 0 | |
| Content - fragment/continuation | 9 | text_data |

3$^{rd}$ piece of document: </root>
Corresponding encoded item data format:

| TYPE | Length | Value |
|---|---|---|
| Content | 0 | |
| End Element Checked | 0 | |

In this manner, the data format of this invention using fragmentation encoded items allows interruption of markup language document streams that do not have to occur at construct boundaries.

Demarcation Encoded Items

Figure 3:
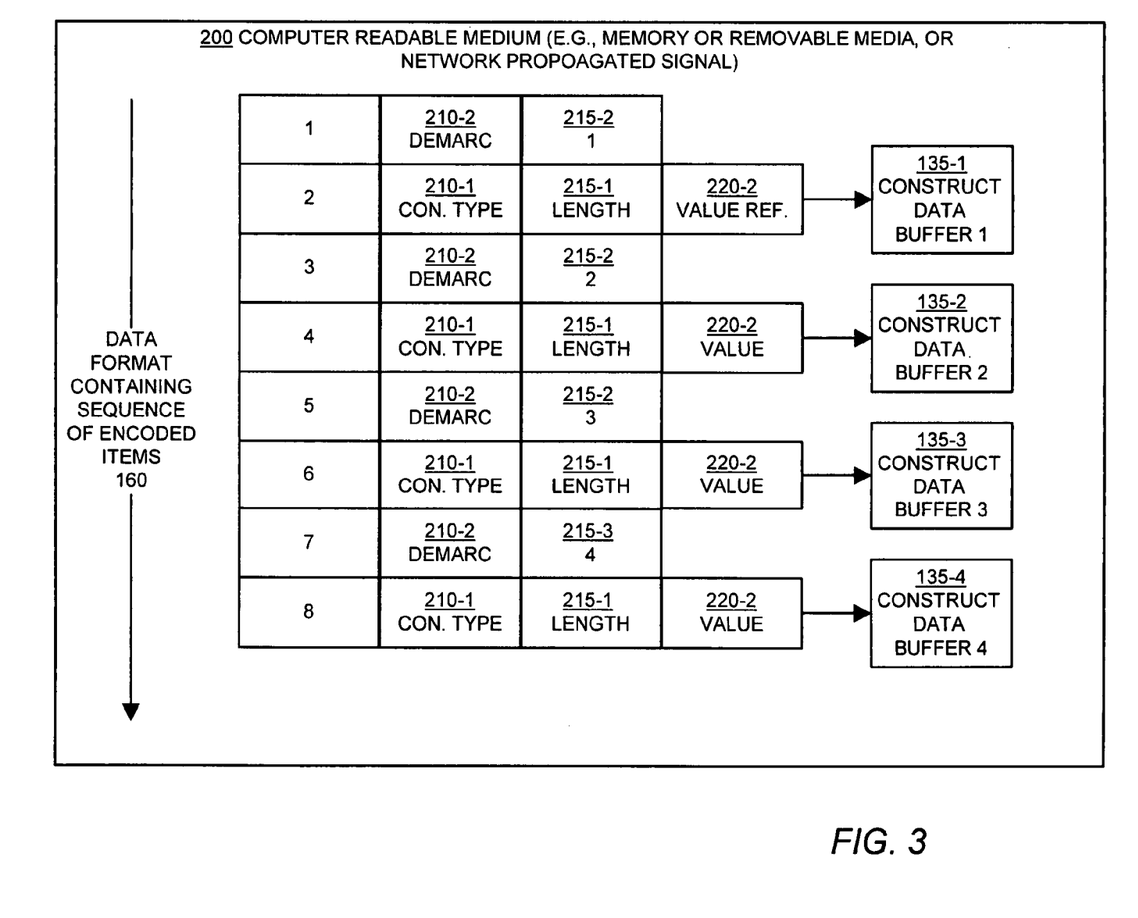
FIG. 3 illustrates the use of demarcation encoded items in accordance with one embodiment of the invention.

FIG. 3 illustrates other aspects of embodiments of the data format disclosed herein. In particular, the encoded items 160 shown in FIG. 3 are fixed length encoded items that provide, within the value fields 220-A, 220-B, 220-C and 220-D, a pointer, address or other reference to the actual construct data that is maintained within respective value buffers 135-1 through 135-4 located elsewhere in memory (i.e., separate from the actual TLV encoded item sequence). In other words, encoded items 160 in the sequence of encoded items that contain a type field having a construct type, a length field, and a value field are each encoded items of a common fixed size since the value field is a construct data reference that references construct data maintained within a construct data buffer in a memory. Thus all value fields can be represented with an equivalent number of bytes—enough to contain a pointer or other reference to the value buffers that can be variable in size. All construct data referenced by the value fields of encoded items in the sequence of encoded items that are of the common fixed size is maintained within respective construct data buffers in the memory that are respectively referenced by the value fields of those fixed size encoded items, such that the encoded item does not contain construct data itself.

Also illustrated in FIG. 3 is the use of demarcation encoded items at lines 1, 3, 5 and 7 of the example sequence of encoded items 160. As discussed above, the sequence of encoded items contains multiple encoded items at lines 2, 4, 6 and 7 representing and referencing (via their value fields) respective portions of construct data placed into respective construct data buffers in the memory. According to the structure shown in FIG. 3, for each distinct construct data buffer in the memory 135-1 through 135-4, the sequence of encoded items includes a respective construct encoded item at lines 2, 4, 6 and 7 containing a type field indicating a markup language construct type associated with the construct data contained in the construct data buffer and a value field that references the construct data (e.g,. a pointer to an address) in a respective construct data buffer in the memory. In addition, the encoded item sequence includes, at lines 1, 3, 5 and 7 contain a respective demarcation encoded item (i.e., a DEMARC TLV) that contains a directive type in its type field and a value in it value field that indicates a demarcation sequence value associated with the construct data contained in a respective construct data buffer 135-1 through 135-4 for the respective encoded item.

In other words, the sequence of encoded items in FIG. 3 includes demarcation encoded items (lines 1, 3, 5 and 7) that each identify a respective demarcation sequence value (1, 2, 3 and 4 in the instant example) each associated with a respective construct data buffer 135-1 through 135-4 in the memory. The demarcation encoded items at lines 1, 3, 5 and 7 allow a process that is processing the sequence of encoded items (e.g., a process such as character processor 120 that is creating the sequence from XML data, or a post-process 180 that is receiving the sequence once created) to efficiently identify which construct data buffers 135 containing markup language construct data (i.e., buffer data as labeled in the figures) in the memory are to be associated with which encoded items at lines 2, 4, 6 and 8 that contain value fields that reference those construct data buffers 135.

The demarcation sequence values are obtained from an incremental demarcation sequence counter 235 that provides sequential values each time a new construct data buffer 135 is populated with construct data. The demarcation sequence values 240 sequentially identify construct data buffers 135 in the memory referenced by sequentially occurring encoded items 2, 4, 6 and 8 in the sequence of encoded items that each reference a construct data buffer in the memory. In the illustrated example, the sequence of encoded items includes a first encoded item at line 2 containing a value field that references construct data in a first construct data buffer 135-1 in memory. The first demarcation encoded item at line 1 is associated with the first construct encoded item at line 2. The demarcation encoded item indicates a first sequence value 240-1 (number 1 in this example) associated with the first construct data buffer 135-1 (the association in this example is that the demarcation encoded item occurs immediately before the construct encoded item to which it is associated). A second construct encoded item at line 4 contains a value field that references construct data in a second construct data buffer 135-2 in memory. A second demarcation encoded item at line 3 is associated with the second encoded item at line 4 and indicates a second sequence value 240-2 (2 in this example) associated with the second construct data buffer 135-2. The first and second demarcation encoded items at lines 1 and 3 allows a process that is processing the sequence of encoded items to efficiently identify which of the first and second construct data buffers 135-1 and 135-2 that contain markup language construct data in the memory are to be associated with which of the first and second encoded items at line 2 and 4 that contain value fields that reference those construct data buffers. The demarcation encoded items are useful in situations where data buffers 135 are being filled for many different construct encoded items (e.g., lines 2, 4, 6 and 8 in the example) and a software process receiving these buffers 135 and the encoded item sequence does not need to perform a memory reference to the value of the encoded item (i.e., does not have to follow a pointer) in order to tell the software which buffers "belong to" which TLV encoded items.

In an alternative configuration, just a "demarcation" TLV (e.g,. only the DEMARC type) is enough information required to identify a buffer and no value field containing the buffer count is required. In such a configuration, the receiving entity can keep track of the number of demarcation TLVs (i.e., just the type DEMARC in the type field) it receives along with the number of construct data buffers. As an example, a third DEMARC encoded item encountered would corresponds to a third construct data buffer received, and no specific number in the value field would be needed. Or in other words, the receiving post-processing entity can assign a number to each buffer received (i.e., can keep count of the buffers) and can count the DEMARC encoded items received. A buffer that matches the number of DEMARC encoded items is the buffer associated with the construct encoded item corresponding to that DEMARC encoded item (e.g, $3^{rd}$ buffer for third DEMARC encoded item).

The example in FIG. 3 only shows the use of demarcation encoded items for four example encoded items and associated data buffers 135. It is to be understood that each time a new construct data buffer is populated and referenced by a construct encoded item, the demarcation sequence value 235 is incremented by 1. Accordingly, during conversion of XML to the encoded item data format containing demarcation encoded items, in one configuration, the computer readable medium (e.g., memory in the computer use to store the data format and buffers created during the XML conversion process) containing the data format of this invention, memory is encoded with N construct data buffers (where N is an integer equal to or greater than 1), each of the N construct data buffers contains respective portions of construct data occurring within the markup language data. The memory is also encoded with 1 through M (where M is an integer equal to or greater than 1) construct encoded items (e.g., like lines 2, 4 and 8 in the FIG. 3 example) each containing a respective value field that references one of 1 through M respective construct data buffers of the N construct data buffers, wherein M is an integer less than N. In other words, in one configuration, there are more data buffers 135 than construct encoded items containing values that reference these buffers. For each of the 1 through M construct encoded items (M=4 in the example in FIG. 3), a respectively associated demarcation encoded item (e.g., at lines 1, 3, 5 and 7 in the example) contains a demarcation sequence value equal to a one of the values 1 through M associated with a construct encoded item of the 1 through M construct encoded items to which that demarcation encoded item is respectively associated. The demarcation sequence value of any demarcation encoded item within the sequence of encoded items indicates, at that point in the sequence of encoded items, how many of the N construct data buffers are presently populated with construct data within the computer readable medium for association to respective construct encoded items of the 1 through M construct encoded items. In another configuration, there is only a need for a demarcation encoded item when there is a new construct data buffer 135 with "value data" in it. Thus multiple construct encoded items (i.e., TLVs) could put their construct (i.e., value) data in the same data buffer and there would only be one demarcation encoded items indicating the construct data buffer storing values for this group of TLVs.

In situations in which the stream of encoded items identifies several buffers 135 that are returned to a post-processing device or process, such as a software program, creation and insertion of a demarcation encoded item for each construct encoded item referencing a distinct value buffer 135 facilitates the identification of which value buffers 135 are to be associated with which particular encoded items containing values referencing those buffers. This can allow for processing of buffers prior to full completion of encoded items sequences. One purpose for demarcation encoded items is that the value portion of a construct encoded item containing the reference to the value buffer might not be known at the time of creation of the data value buffer and return of this buffer to a software process. As such, the demarcation encoded item allows a process that is processing a sequence of encoded items to efficiently identify which construct data value buffers containing markup language construct data in memory are to be associated with which encoded items that contain value fields that reference those construct data buffers. In this manner, encoded items can be maintained in a fixed size format and all the data is maintained in value buffers. The demarcation encoded items thus enhance processing performance of the software that receives encoded item sequences and associated data value buffers 135.

Figure 4:
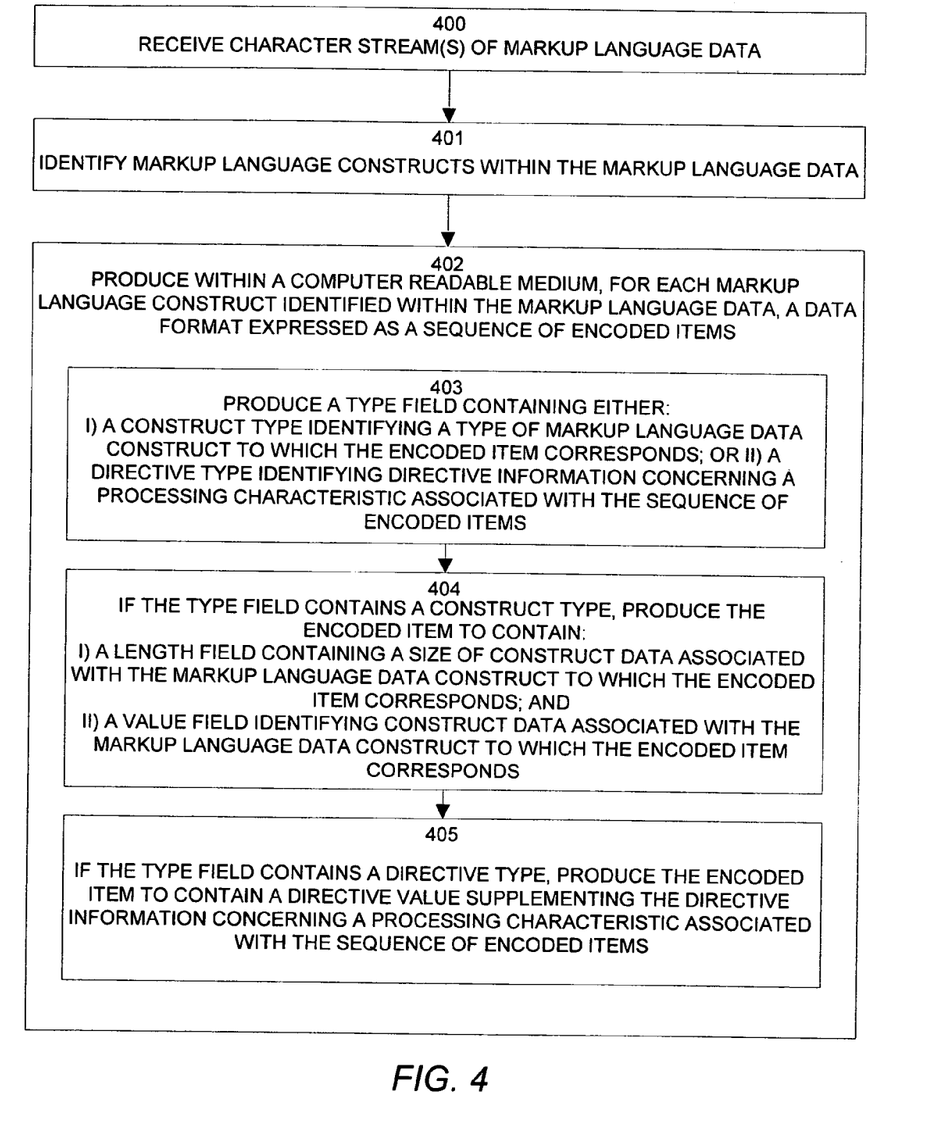
FIG. 4 is is a flow chart of processing steps that a computerized device performs to create a markup language encoded item data format in accordance with one embodiment the invention.

FIG. 4 is a flowchart of processing steps that a character processor 120 configured in accordance with one example embodiment of the invention performs to process character streams of markup language data in one configuration to convert markup language data into a data format expressed as a sequence of encoded items.

In step 400, the character processor 120 receives a character stream of markup language data 105.

In step 401, the character processor 120 identifies markup language constructs within the markup language data.

In step 402, the character processor 120 produces within a computer readable medium, for each markup language construct identified within the markup language data, a data format expressed as a sequence of encoded items. Sub-steps 403 through 405 indicate processing operations performed by a computerized device and using the methods disclosed herein to create each encoded item.

In step 403, the character processor 120 produces a type field containing either i) a construct type identifying a type of markup language data construct to which the encoded item corresponds, or ii) a directive type identifying directive information concerning a processing characteristic associated with the sequence of encoded items.

In step 404, if the type field contains a construct type, the character processor 120 produces the encoded item to contain i) a length field containing a size of construct data associated with the markup language data construct to which the encoded item corresponds, and ii) a value field identifying construct data associated with the markup language data construct to which the encoded item corresponds.

In step 405, if the type field contains a directive type, the character processor 120 produces the encoded item to contain a directive value supplementing the directive information concerning a processing characteristic associated with the sequence of encoded items.

In this manner, the processing of embodiments described above provides the data formats and specific encoded items disclosed herein. The specific encoded items such as the namespace encoded items, close start element encoded items, fragmentation encoded items, demarcation encoded items, unnecessary whitespace encoded items, start and end element checked and unchecked encoded items and so forth are produced using the processing steps 400 through 405 supplemented using the specific processing associated with each of those specific encoded items as explained above.

Those skilled in the art will understand that there can be many variations made to the embodiments explained above while still achieving the same objective of those embodiments and the invention in general. As an example, it is to understood that embodiments of the invention are not limited to processing XML markup language streams 105, but are applicable to converting any type of markup language to encoded item format. In addition, embodiments may be implemented in hardware as a set of gates programmed into a microcontroller such as a Field Programmable Gate Array (FPGA) or equivalent device. In such an embodiment, a developer of a system including an embodiment of the invention embeds the method for processing markup language data as a series of logic instructions within a dedicated programmable microcontroller in hardware (as opposed to providing such instructions as software code that executes on a general purposes central processing unit). The programmable microcontroller may be a FPGA microchip that includes an input interface (e.g., a data bus or input pins into the chip) for receiving the character stream of markup language data and an output interface (e.g., an output bus, or set of pins, that may be the same as the input interface pins) for producing sequences of encoded items for each respective stream 105 (e.g., different streams received on different connections). The microcontroller can thus embody the character processor 120 (or the character processor 120 can be a portion of the logic embedded within the microcontroller) and may include some or all of the computer readable medium as on-chip memory and can be included in the computerized device 110, that may be a dedicated markup language processing device. In operation, the programmable microcontroller operates in hardware to process the markup language data representation such that all processing of the markup language data is done in hardware and such that software processing of the markup language data is not required by a general-purpose central processing unit (e.g., a CPU in a computer that loads and executes software programs), other than post-processing by software and/or hardware of the encoded item data format.

Thus, a hardware-based embodiment provides a encoded item creator such as the character processor. Accordingly, embodiments of the invention are not intended to be limiting to the aforementioned discussion, but rather, equivalents and variations now apparent to those skilled in the art from reading this disclosure of the aforementioned processing steps are intended to be included as embodiments of the invention as well.

What is claimed is:

1. A computer readable medium configured with a data format representing markup language data, the data format expressed as a sequence of encoded items, an encoded item of the data format comprising:
   a type field containing at least one of:
      i) a construct type identifying a type of markup language data construct to which the encoded item corresponds; and
      ii) a directive type identifying directive information concerning a processing characteristic associated with the sequence of encoded items; and
   if the type field contains a construct type, the encoded item further comprises:
      i) a length field containing a size of construct data associated with the markup language data construct to which the encoded item corresponds; and
      ii) a value field identifying construct data associated with the markup language data construct to which the encoded item corresponds; and
   if the type field contains a directive type, the encoded item further comprises:
      a directive value supplementing the directive information concerning a processing characteristic associated with the sequence of encoded items, wherein the data format includes a namespace encoded item that identifies a namespaces associated with at least a portion of the markup language data represented by the data format.

2. The computer readable medium of claim 1 wherein the namespace encoded item contains:
   a type field containing a namespace construct type indicating that the encoded item represents a namespace associated with the markup language data; and
   a value field identifying namespace construct data that indicates the namespace associated with the at least a portion of the markup language data represented by the data format.

3. The computer readable medium of claim 2 wherein the sequence of encoded item further includes a close start element encoded item, the close start element encoded item containing:
   a type field containing a close start element construct type indicating an end of a start element construct within the markup language data represented by the data format, the close start element encoded item allowing a computing device that processes the sequence of encoded items to identify a group of encoded items associated with the namespace associated with the markup language data as indicated by the namespace construct data and to map elements within the group of encoded items to the namespace.

4. The computer readable medium of claim 1 wherein the data format includes a fragmentation type length value encoded item that identifies a fragmented markup language construct indicating that construct data identified in the value field of the encoded item is not a complete representation of construct data associated with the markup language construct to which that encoded item corresponds.

5. The computer readable medium of claim 4 wherein:
   the type field is a fragmented construct type that identifies the fragmented markup language construct that occurred during creation of the data format representing the markup language data due to an interruption in the markup language data; and
   wherein the type length value encoded item that identifies the fragmented markup language construct is a last encoded item containing markup language data generated in the sequence of encoded items up to the interruption in the markup language data.

6. The computer readable medium of claim 1 wherein encoded items in the sequence of encoded items that contain a type field having a construct type, a length field, and a value field are each encoded items of a common fixed size;
   wherein the value field is a construct data reference that references construct data maintained within a construct data buffer in a memory; and
   wherein all construct data referenced by the value fields of encoded items in the sequence of encoded items that are of the common fixed size is maintained within respective construct data buffers in the memory that are respectively referenced by the value fields of those fixed size encoded items, such that the encoded item does not contain construct data itself.

7. The computer readable medium of claim 1 wherein construct data referenced by the value fields of encoded items in the sequence of encoded items is maintained within respective construct data buffers in the memory that are respectively referenced by the value fields of those encoded items.

8. The computer readable medium of claim 1 wherein the sequence of encoded items contains multiple encoded items representing and referencing respective portions of construct data placed into respective construct data buffers in the memory; and
   wherein for each distinct construct data buffer in the memory, the sequence of encoded items includes:
      i) a respective encoded item containing a type field indicating a markup language construct type associated with the construct data contained in the construct data buffer and a value field that references the construct data in a respective construct data buffer in the memory; and
      ii) a demarcation encoded item that contains a directive type in the type field that indicates a demarcation sequence value associated with the construct data contained in the construct data buffer for the respective encoded item.

9. The computer readable medium of claim 1 wherein the sequence of encoded items includes demarcation encoded items that each respectively identify a respective demarcation sequence value associated with a respective construct data buffer in the memory, the demarcation encoded items allowing a process that is processing the sequence of encoded items to efficiently identify which construct data buffers containing markup language construct data in the memory are to be associated with which encoded items that contain value fields that reference those construct data buffers.

10. The computer readable medium of claim 9 wherein the demarcation sequence values are sequential values that sequentially identify construct data buffers in the memory referenced by sequentially occurring encoded items in the sequence of encoded items that each reference a construct data buffer in the memory.

11. The computer readable medium of claim 1 wherein the sequence of encoded items includes:
   i) a first encoded item containing a value field that references construct data in a first construct data buffer in memory;
   ii) a first demarcation encoded item associated with the first encoded item that indicates a first sequence value associated with the first construct data buffer;
   iii) a second encoded item containing a value field that references construct data in a second construct data buffer in memory;
   iv) a second demarcation encoded item associated with the second encoded item that indicates a second sequence value associated with the second construct data buffer,
   the first and second demarcation encoded items allowing a process that is processing the sequence of encoded items to efficiently identify which of the first and second construct data buffers containing markup language construct data in the memory are to be associated with which of the first and second encoded items that contain value fields that reference those construct data buffers.

12. The computer readable medium of claim 1 wherein the computer readable medium is encoded with:
   N construct data buffers, each of the N construct data buffers containing respective portions of construct data occurring with the markup language data;
   1 through M construct encoded items each containing a respective value field that references one of 1 through M respective construct data buffers of the N construct data buffers, wherein M is an integer less than N;
   For each of the 1 through M construct encoded items, a respectively associated demarcation encoded item containing a demarcation sequence value equal to a one of the values 1 through M associated with a construct encoded item of the 1 through M construct encoded items to which that demarcation encoded item is respectively associated, the demarcation sequence value of any demarcation encoded item within the sequence of encoded items indicating, at that point in the sequence of encoded items, how many of the N construct data buffers are presently populated with construct data within the computer readable medium for association to respective construct encoded items of the 1 through M construct encoded items.

13. The computer readable medium of claim 1 wherein the data format includes an end element checked encoded item that identifies that element consistency with the markup language data represented by the encoded items up to the point of existence of the end element check encoded has been confirmed.

14. The computer readable medium of claim 1 wherein the data format includes an end element unchecked encoded item that identifies that element consistency with the markup language data represented by the encoded items up to the point of existence of the end element check encoded has not been confirmed.

15. The computer readable medium of claim 1 wherein the data format includes an unnecessary whitespace encoded item that identifies unnecessary whitespace occurring within the markup language data represented by the sequence of encoded items.

16. The computer readable medium of claim 1 further encoded with logic instructions that provide a software program, that when executed on a computerized device, perform conversion of markup language data into the data format expressed as a sequence of encoded items.

17. The computer readable medium of claim 1 further encoded with logic instructions that provide a software program, that when executed on a computerized device, receive and process the data format expressed as a sequence of encoded items.

18. A method of converting markup language data into a data format expressed as a sequence of encoded items, the method comprising:
   receiving a stream of markup language data;
   identifying markup language constructs within the markup language data;
   for each markup language construct identified within the markup language data, producing, within a computer readable medium, a data format expressed as a sequence of encoded items, an encoded item of the data format comprising:
   a type field containing at least one of:
      i) a construct type identifying a type of markup language data construct to which the encoded item corresponds; and
      ii) a directive type identifying directive information concerning a processing characteristic associated with the sequence of encoded items; and
   if the type field contains a construct type, the encoded item further comprises:
      i) a length field containing a size of construct data associated with the markup language data construct to which the encoded item corresponds; and
      ii) a value field identifying construct data associated with the markup language data construct to which the encoded item corresponds; and
   if the type field contains a directive type, the encoded item further comprises:
      a directive value supplementing the directive information concerning a processing characteristic associated with the sequence of encoded items, wherein the producing the data format comprises producing a namespace encoded item that identifies a namespaces associated with at least a portion of the markup language data represented by the data format.

19. The method of claim 18 wherein the namespace encoded item contains:
   a type field containing a namespace construct type indicating that the encoded item represents a namespace associated with the markup language data; and
   a value field identifying namespace construct data that indicates the namespace associated with the at least a portion of the markup language data represented by the data format.

20. The method of claim 19 wherein producing the data format as a sequence of encoded items further comprises producing a close start element encoded item, the close start element encoded item containing:
   a type field containing a close start element construct type indicating an end of a start element construct within the markup language data represented by the data format, the close start element encoded item allowing a computing device that processes the sequence of encoded items to identify a group of encoded items associated with the namespace associated with the markup language data as indicated by the namespace construct data and to map elements within the group of encoded items to the namespace.

21. The method of claim 18 wherein the producing the data format comprises producing a fragmentation type length value encoded item that identifies a fragmented markup language construct indicating that construct data identified in the value field of the encoded item is not a complete representation of construct data associated with the markup language construct to which that encoded item corresponds.

22. The computer readable medium of claim 21 wherein:
the type field is a fragmented construct type that identifies the fragmented markup language construct that occurred during creation of the data format representing the markup language data due to an interruption in the markup language data; and
wherein the type length value encoded item that identifies the fragmented markup language construct is a last encoded item containing markup language data generated in the sequence of encoded items up to the interruption in the markup language data.

23. The method of claim 18 wherein encoded items in the sequence of encoded items that contain a type field having a construct type, a length field, and a value field are each encoded items of a common fixed size;
wherein the value field is a construct data reference that references construct data maintained within a construct data buffer in a memory; and
wherein the method comprises maintaining all construct data referenced by the value fields of encoded items in the sequence of encoded items that are of the common fixed size within respective construct data buffers in the memory that are respectively referenced by the value fields of those fixed size encoded items, such that the encoded item does not contain construct data itself.

24. The method of claim 18 comprising maintaining construct data referenced by the value fields of encoded items in the sequence of encoded items within respective construct data buffers in the memory that are respectively referenced by the value fields of those encoded items.

25. The method of claim 18 wherein producing the data format comprises producing the sequence of encoded items to contain multiple encoded items representing and referencing respective portions of construct data placed into respective construct data buffers in the memory; and
wherein for each distinct construct data buffer in the memory, producing the data format comprises producing the sequence of encoded items to include:
i) a respective encoded item containing a type field indicating a markup language construct type associated with the construct data contained in the construct data buffer and a value field that references the construct data in a respective construct data buffer in the memory; and
ii) a demarcation encoded item that contains a directive type in the type field that indicates a demarcation sequence value associated with the construct data contained in the construct data buffer for the respective encoded item.

26. The method of claim 18 wherein producing the data format comprises producing the sequence of encoded items to include demarcation encoded items that each respectively identify a respective demarcation sequence value associated with a respective construct data buffer in the memory, the demarcation encoded items allowing a process that is processing the sequence of encoded items to efficiently identify which construct data buffers containing markup language construct data in the memory are to be associated with which encoded items that contain value fields that reference those construct data buffers.

27. The method of claim 26 wherein producing the data format comprises producing the demarcation sequence values as sequential values that sequentially identify construct data buffers in the memory referenced by sequentially occurring encoded items in the sequence of encoded items that each reference a construct data buffer in the memory.

28. The method of claim 18 wherein producing the data format comprises producing the sequence of encoded items to include:
i) a first encoded item containing a value field that references construct data in a first construct data buffer in memory;
ii) a first demarcation encoded item associated with the first encoded item that indicates a first sequence value associated with the first construct data buffer;
iii) a second encoded item containing a value field that references construct data in a second construct data buffer in memory;
iv) a second demarcation encoded item associated with the second encoded item that indicates a second sequence value associated with the second construct data buffer;
and wherein the method comprises
processing the sequence of encoded items to efficiently identify, using the first and second demarcation encoded items, which of the first and second construct data buffers containing markup language construct data in the memory are to be associated with which of the first and second encoded items that contain value fields that reference those construct data buffers.

29. The method of claim 18 wherein producing the data format comprises producing:
N construct data buffers, each of the N construct data buffers containing respective portions of construct data occurring with the markup language data;
1 through M construct encoded items each containing a respective value field that references one of 1 through M respective construct data buffers of the N construct data buffers, wherein M is an integer less than N;
For each of the 1 through M construct encoded items, producing a respectively associated demarcation encoded item containing a demarcation sequence value equal to a one of the values 1 through M associated with a construct encoded item of the 1 through M construct encoded items to which that demarcation encoded item is respectively associated, the demarcation sequence value of any demarcation encoded item within the sequence of encoded items indicating, at that point in the sequence of encoded items, how many of the N construct data buffers are presently populated with construct data within the computer readable medium for association to respective construct encoded items of the 1 through M construct encoded items.

30. The method of claim 18 wherein producing the data format comprises producing an end element checked encoded item that identifies that element consistency with the markup language data represented by the encoded items up to the point of existence of the end element check encoded has been confirmed.

31. The method of claim 18 wherein producing the data format comprises producing an end element unchecked encoded item that identifies that element consistency with the markup language data represented by the encoded items up to the point of existence of the end element check encoded has not been confirmed.

32. The method of claim 18 wherein producing the data format comprises producing an unnecessary whitespace encoded item that identifies unnecessary whitespace occurring within the markup language data represented by the sequence of encoded items.

33. A computerized device configured to convert markup language data into a data format expressed as a sequence of encoded items, the computerized device comprising:
   an input interface to receive a stream of markup language data;
   a character processor coupled to the input interface, the character processor identifying markup language constructs within the markup language data received on the input interface;
   a computer readable medium coupled to receive output from the character processor;
   the character processor producing, as output within a computer readable medium, for markup language constructs identified within the markup language data, a data format expressed as a sequence of encoded items, an encoded item of the data format comprising:
   a type field containing at least one of:
      i) a construct type identifying a type of markup language data construct to which the encoded item corresponds; and
      ii) a directive type identifying directive information concerning a processing characteristic associated with the sequence of encoded items; and
   if the type field contains a construct type, the encoded item further comprises:
      i) a length field containing a size of construct data associated with the markup language data construct to which the encoded item corresponds; and
      ii) a value field identifying construct data associated with the markup language data construct to which the encoded item corresponds; and
   if the type field contains a directive type, the encoded item further comprises:
      a directive value supplementing the directive information concerning a processing characteristic associated with the sequence of encoded items, wherein the character processor produces a fragmentation type length value encoded item that identifies a fragmented markup language construct indicating that construct data identified in the value field of the encoded item is not a complete representation of construct data associated with the markup language construct to which that encoded item corresponds.

34. The computerized device of claim 33 comprising:
   an encoded item post-processing mechanism coupled to access the computer readable medium to access the data format containing the sequence of encoded items including the fragmentation type length value encoded item; and wherein:
   the type field is a fragmented construct type that identifies, to the encoded item post-processing mechanism, the fragmented markup language construct that occurred during creation of the data format representing the markup language data due to an interruption in receipt of the markup language data on the input interface; and
   wherein the fragmentation type length value encoded item that identifies the fragmented markup language construct identifies, to the encoded item post-processing mechanism, that the fragmentation type length value encoded item that is a last encoded item containing markup language data generated in the sequence of encoded items up to the interruption in the markup language data on the input interface.

35. The computerized device of claim 33 wherein the character processor produces the sequence of encoded items to include:
   i) a first encoded item containing a value field that references construct data in a first construct data buffer in memory;
   ii) a first demarcation encoded item associated with the first encoded item that indicates a first sequence value associated with the first construct data buffer;
   iii) a second encoded item containing a value field that references construct data in a second construct data buffer in memory;
   iv) a second demarcation encoded item associated with the second encoded item that indicates a second sequence value associated with the second construct data buffer;
   and wherein the character processor processes the sequence of encoded items received on the input interface to efficiently identify, using the first and second demarcation encoded items, which of the first and second construct data buffers containing markup language construct data in the memory are to be associated with which of the first and second encoded items that contain value fields that reference those construct data buffers.

36. The computerized device of claim 32 comprising:
   an encoded item post-processing mechanism coupled to access the computer readable medium to access the data format containing the sequence of encoded items, and to access the construct data buffers in memory; and
   wherein the character processor produces:
   N construct data buffers, each of the N construct data buffers containing respective-portions of construct data occurring with the markup language data;
   1 through M construct encoded items each containing a respective value field that references one of 1 through M respective construct data buffers of the N construct data buffers, wherein M is an integer less than N;
   For each of the 1 through M construct encoded items, the character processor produces, in the computer readable medium, a respectively associated demarcation encoded item containing a demarcation sequence value equal to a one of the values 1 through M associated with a construct encoded item of the 1 through M construct encoded items to which that demarcation encoded item is respectively associated, the demarcation sequence value of any demarcation encoded item within the sequence of encoded items indicating, to the encoded item post-processing mechanism, at that point in the sequence of encoded items, how many of the N construct data buffers are presently populated with construct data within the computer readable medium for association to respective construct encoded items of the 1 through M construct encoded items.

* * * * *